United States Patent
Polcha, Sr. et al.

(10) Patent No.: US 9,886,589 B2
(45) Date of Patent: *Feb. 6, 2018

(54) LEVERAGING DIGITAL SECURITY USING INTELLIGENT PROXIES

(71) Applicants: Andrew John Polcha, Sr., Lovettsville, VA (US); Michael Patrick Polcha, Sr., Lovettsville, VA (US)

(72) Inventors: Andrew John Polcha, Sr., Lovettsville, VA (US); Michael Patrick Polcha, Sr., Lovettsville, VA (US)

( * ) Notice: Subject to any disclaimer, the term of this patent is extended or adjusted under 35 U.S.C. 154(b) by 90 days.

This patent is subject to a terminal disclaimer.

(21) Appl. No.: 14/961,846

(22) Filed: Dec. 7, 2015

(65) Prior Publication Data

US 2016/0085984 A1 Mar. 24, 2016

Related U.S. Application Data

(63) Continuation of application No. 13/467,975, filed on May 9, 2012, now Pat. No. 9,210,190.

(60) Provisional application No. 61/484,353, filed on May 10, 2011.

(51) Int. Cl.
| | |
|---|---|
| G06F 17/00 | (2006.01) |
| H04L 29/06 | (2006.01) |
| G06F 21/62 | (2013.01) |
| G06F 21/60 | (2013.01) |
| H04L 29/08 | (2006.01) |

(52) U.S. Cl.
CPC ........ *G06F 21/6209* (2013.01); *G06F 21/604* (2013.01); *H04L 63/0272* (2013.01); *H04L 63/0281* (2013.01); *H04L 63/0428* (2013.01); *H04L 63/06* (2013.01); *H04L 63/102* (2013.01); *H04L 63/20* (2013.01); *H04L 67/104* (2013.01); *G06F 21/6218* (2013.01)

(58) Field of Classification Search
CPC ........ H04L 63/20; H04L 63/10; H04L 63/08; G06F 21/6218
See application file for complete search history.

(56) References Cited

U.S. PATENT DOCUMENTS

| | | |
|---|---|---|
| 2004/0054893 A1 | 3/2004 | Ellis |
| 2004/0168049 A1 | 8/2004 | Lee |
| 2005/0039034 A1 | 2/2005 | Doyle et al. |
| 2005/0066165 A1 | 3/2005 | Peled et al. |
| 2005/0257048 A1 | 11/2005 | Willman |
| 2008/0140846 A1 | 6/2008 | Rehm |
| 2008/0148046 A1* | 6/2008 | Glancey .......... G06F 21/33 713/156 |
| 2008/0301760 A1 | 12/2008 | Lim |
| 2009/0158418 A1 | 6/2009 | Rao et al. |
| 2010/0050244 A1 | 2/2010 | Tarkhanyan et al. |
| 2010/0107222 A1 | 4/2010 | Glasser |
| 2010/0211375 A1 | 8/2010 | Gersten et al. |
| 2010/0235649 A1 | 9/2010 | Jeffries et al. |

* cited by examiner

*Primary Examiner* — Alexander Lagor
(74) *Attorney, Agent, or Firm* — Doster Greene, LLC

(57) ABSTRACT

A method for protecting data is disclosed that protects not only who may access data but also how it is used. This invention uses an intelligent proxy which controls access to protected data using any of a variety of already existing security measures and is also the only object capable of making use of the data so that the data may not be copied or otherwise used in any manner inconsistent with the design of a data protection scheme chosen to meet security needs.

24 Claims, 7 Drawing Sheets

LEVERAGING DIGITAL SECURITY USING INTELLIGENT PROXIES

CROSS-REFERENCE TO RELATED APPLICATIONS

This application is a Continuation application of application Ser. No. 13/467,975, filed May 9, 2014, which claims the benefit of provisional patent application Ser. No. 61/484,353, filed 2011 May 10. The entire disclosure of this application is expressly incorporated herein by reference.

BACKGROUND

Prior Art

The following is a tabulation of some prior art that presently appears relevant:

U.S. Patents

| Pat. No. | Kind Code | Issue Date | Patentee |
| --- | --- | --- | --- |
| 6,931,450 | B1 | 2005 Aug. 16 | Howard |

U.S. Patent Application Publications

| Publication Nr. | Kind Code | Publ. Date | Applicant |
| --- | --- | --- | --- |
| 20030046587 | A1 | 2003 Mar. 6 | Bheemarasetti |
| 20060080397 | A1 | 2006 Apr. 13 | Chene |

FIELD OF INVENTION

The present invention relates to the field of data security, more specifically to protect data at rest not only from unauthorized access but also from unauthorized use when access is granted.

BACKGROUND OF INVENTION

Advanced computer hardware and software systems are integral to the ever-increasing number of critical environments, including information systems, support systems, and supports services. Within these systems, data security is an important topic with a critical need to protect valuable and sensitive information. Stationary digital data such as data files and software applications when stored can be defined as data "at rest". There are several methodologies and approaches to protecting sensitive data from unauthorized access. A common approach to protecting stored digital data is by use of encryption methods which are well known in the art. Encryption can protect both the initial transmission of data to an end-user as well as the data at rest after transmission. In order to access the protected and encrypted data, the end-user needs a decryption key to view the protected content.

In the above scenario, there is no mechanism that prevents the user from intentionally or unintentionally sharing the decryption key. Furthermore encryption does not at all limit the duplication, transmission, or distribution of encrypted content which facilitates: 1.) increased availability of user time for cracking; 2.) increased availability of processing time, e.g. multiple processing brute force approaches via segmentation of key spaces; 3.) increased immediate cost and impact to the spillage event once the key is determined and shared because the encrypted content could have advance wide distribution.

What encryption cannot do in regards to data security is enforce secure policies for "how" that data is to be used by the end-user. Once the end-user decrypts protected content, that content is no longer in a secure state and has no mechanisms in place to ensure that the user can not exploit that sensitive data i.e. copy, change, edit, print, destroy or distribute.

There is also sensitive data that can be stored and reside on a private topology or local area network. In a network environment, standard security components as are well known in the art are inherent within most topology methodologies to prevent and monitor unauthorized access, misuse, or modification of network-accessible resources. Network security involves the authorization of access to data in a network, which is controlled and managed by directory services such as MS Active Directory or LDAP services. Account "users" of the network are assigned certain rights and privileges, whereby authentication grants them access to certain information or programs within their authority. Network security starts with authenticating the user, commonly with a username and a password, and access is granted if and only the user is properly authenticated. Proper network authentication provides access to data where users can store, view, modify, print, or transfer the digital information that they have access to. However, like encryption, once a user is authenticated by the system, access to protected data is mostly uncontrolled and vulnerable to unwanted duplication. If data is ever in a readable state whether decrypted or accessed from a network, it can be copied.

Standard networking tools provide for a multiplicity of user and resource permissions as are well known in the art to be selected and controlled. These advanced permissions go a long way to enhancing the general security of sensitive data by providing the means to control the behavior of an allowed user of that sensitive data. Even so, within these systems and environments there exist master keys, e.g. administrator passwords, that provide super users unfettered access to all data within information systems and subsystems. The existence of super users within the information systems is a "necessary evil", as someone needs access to fundamental machinery to build and maintain the information system. In order to close the current gaping security holes, a new technology is needed that grants the originator of the sensitive data the means of securing and distributing access to the data while not being vulnerable to super user fiat.

SUMMARY OF INVENTION

In accordance with one embodiment an optional authentication mechanism is coupled with a usage policy and data viewer in an executable proxy program whose behavior is configurable even after distribution so that data files are accessible by users only through the proxy, thus controlling not only who may access the file, but also how it may be used, specifically that it may not be copied.

Drawing Reference Numerals

| | | | |
|---|---|---|---|
| 10 | proxy | 11 | user authentication |
| 12 | data representing FTBP | 13 | human readable rendering |
| 14 | decrypted copy of FTBP | 21 | GSSA |
| 22 | FLA | 23 | access and usage rules |
| 31 | data viewer | 32 | authentication mechanism |
| 34 | decryption engine | 35 | link to data |
| 40a-c | proxy/data configurations | 42 | GSSA with access/usage rules |
| 43 | proxy minus local data | 44 | proxy minus remote data |
| 45 | computer network | 50a-c | remote data configurations |
| 51 | user computer | 52a | LAN or WAN |
| 52b | USB network connection | 52c | VM LAN connection |
| 53 | Sever with data | 54 | USB computer |
| 55 | user's VM | 57 | VM containing data |
| 60 | authenticated user | 61 | configuration data |
| 62 | reconfigured proxy | | |

DETAILED DESCRIPTION

The present invention is an intelligent proxy (or "proxy" for short) that leverages data security to control not only access to protected data (File To Be Protected or FTBP) but also how such data may be used. The proxy is an executable file or suite of files which executes on a user's computer and serves as a secure interface between the user and the FTBP. Consequently, the proxy serves as a middle-ware that interacts with the data representing the FTBP on behalf of the user. The proxy displays (or executes) the FTBP according to the usage policy which always specifically disallows copying of unencrypted FTBP and may contain other usage policy elements such as those detailed below.

The proxy is referred to as an intelligent proxy because it can, but is not required to, be remotely configurable upon each use. Thus, an "intelligent" proxy can close security holes even after distribution. The proxy, after the steps of (1) optionally updating itself, (2) optionally authenticating the user, and (3) determining the usage policy limitation (not necessarily in that order) becomes the FTBP viewer by generating a human readable representation of the FTBP.

Figure 1:
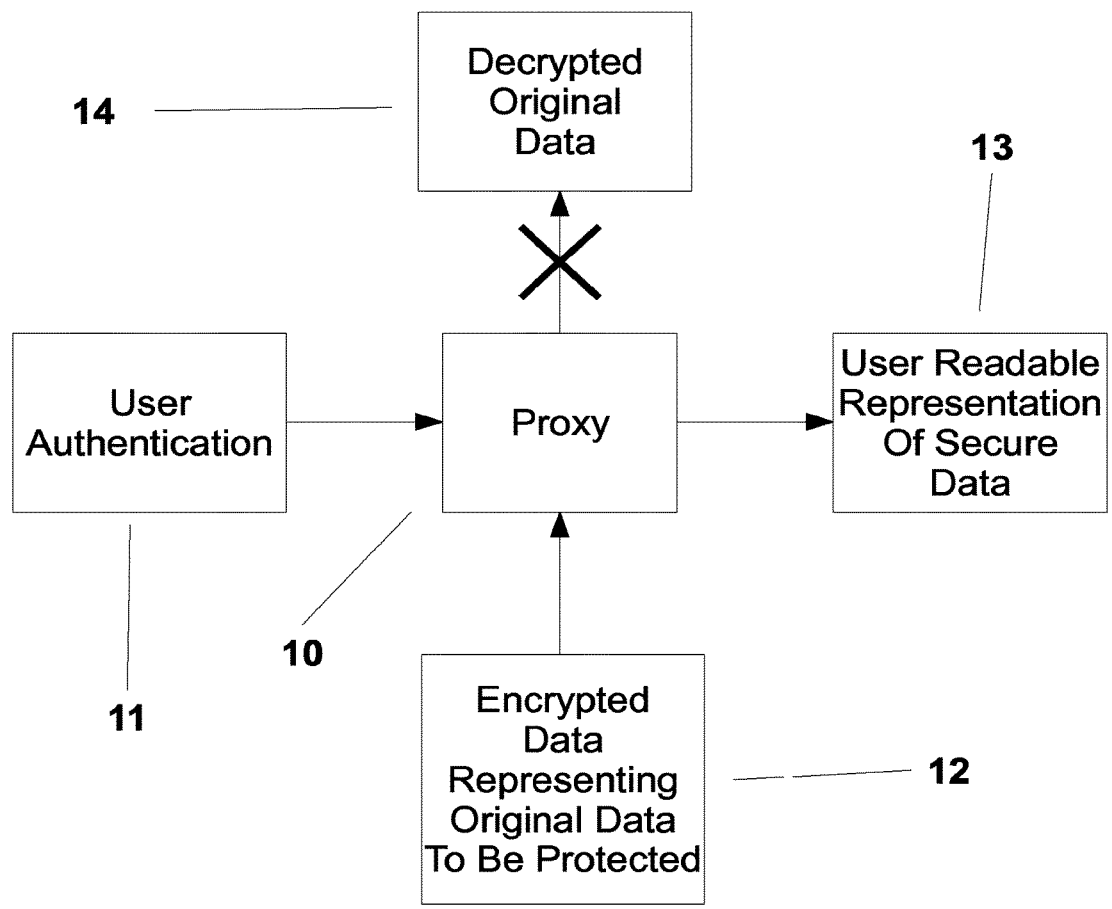
FIG. 1—This figure depicts the operation of the intelligent proxy accessing the File To Be Protected (FTBP).

FIG. 1 depicts the canonical use of the intelligent proxy. The proxy 10 first authenticates the user 11 and then, according to the usage policy, allows the authorized user to access the FTBP 12, but controls what the user is able to do with it. That is, it generates a user readable representation 13 of the FTBP from data representing the FTBP, but the user cannot regenerate an unencrypted copy the FTBP 14, nor can the data representing the FTBP be copied. Thus, the FTBP is entirely protected from copy. Only the proxy itself, which is an executable program, may be copied. Depending on security requirements, the usage policy may or may not allow access to the FTBP from a copied proxy. With sufficient security access rules (i.e. hardware fingerprint, license from server, etc.), copied proxies could be designed to deny access to the FTBP. Consequently, the intelligent proxy is a distinguishable improvement over existing data security measures such as simple password protection of an encrypted file. Furthermore, it would take nothing short of some combination of cracking, reverse engineering, and sophisticated computer forensics to recover the decrypted representation of the FTBP that is internal to the proxy and never directly accessible to the user.

In a manner consistent with the present invention, only the proxy is ever available to any end user, whether directly distributed or placed on a network share accessible to the user. The original FTBP is never distributed in any form, and, furthermore, the FTBP resides only in its original form on a computer system inaccessible to any user regardless of user level or share level access permissions. In this manner, the FTBP is secure from leakage by any user while still allowing end users limited, and not unfettered access to its contents. As such, the proxy is the digital analogue of a safe where even if the safe can be opened, the contents can be only viewed, but not removed. Consequently, the FTBP cannot be leaked from either its original location or out of the user accessible security container which is the proxy which is a major motivation for the present invention.

The various embodiments of this invention are partly defined by how and where the following pieces are implemented and located: the original FTBP, data representing the FTBP as used by the proxy, the user authentication, usage policy, and the FTBP viewer. The FTBP is always hidden and completely inaccessible to the user. When reference is made below to the user "gaining access to the FTBP", this means that the viewer is displaying the usage-policy-allowed human readable rendering of the FTBP. The data representing the FTBP is, in most embodiments, an encrypted form of the FTBP, and that is the data used by the proxy to display the FTBP to the user. Different embodiments place the data representing the FTBP in different places as detailed below. The data representing the FTBP is specifically not the FTBP itself, although in one embodiment, it is an unencrypted copy embedded in the proxy itself in situations where speed of accessing the data is more important than security. Finally, the proxy is made up of the authentication mechanism, the usage policy, and the viewer, and in some embodiments, the data representing the FTBP. That is, the location of everything except the data is inside the proxy. The different forms of the authentication, usage policy, and view and the location of the data partly define the various embodiments of this invention.

In addition to the elements above, various embodiments of this invention are further defined by "look and feel" of the proxy. Various embodiments are yet further defined by how intelligent the proxy is, and the mechanism used by the proxy to update itself as discussed later. Finally, various embodiments are defined by how the proxy is constructed.

Look and Feel of the Intelligent Proxy

In one embodiment, the proxy would have the same "look and feel" of the original FTBP. The term "look and feel" refers specifically to two characteristics of the FTBP—(1) the meta-data attributes such as the icon, creation date, or other properties like vendor or publisher and (2) when accessed, the overall experience is as nearly identical to accessing the original FTBP preserving as much as allowable by the usage policy, e.g. without a save or copy mechanism.

For example, within a Windows environment, if the FTBP was a MS Word document, the original file name, icon and of the FTBP as well as the file attributes would be mirrored in the proxy with minor exceptions. The original FTBP is an MS Word file with a ".doc" file extension, but the proxy interfacing it is an executable with an ".exe" file extension, and, as such, it cannot be opened with MS Word. Furthermore, the proxy does not open the FTBP with MS Word, but rather, the proxy itself is the viewer, looking very much like MS Word, but without any save mechanism.

As another example, the FTBP is an executable program, it would have exactly the same name (including the ".exe" extension), icon graphic, and file attributes as the original executable program. In this case, the behavior of the proxy from the user's point of view is identical to the original FTBP except for the addition of authentication and usage policy. Consequently, the "viewer" portion of the proxy is really a program launcher, and the "human readable rendering" is simply an instance of the executable program running on the user's computer.

Regardless of the computer operating system (Windows, Linux, Mac OS, etc.) on which the proxy resides, the "look and feel" embodiment always mirrors as much as possible the attributes and behavior of the original FTBP. This is, however, only one embodiment, and the intelligent proxy does not necessarily contain the "look and feel" element, nor is it invariably desirable.

Generating the Intelligent Proxy

Figure 2:
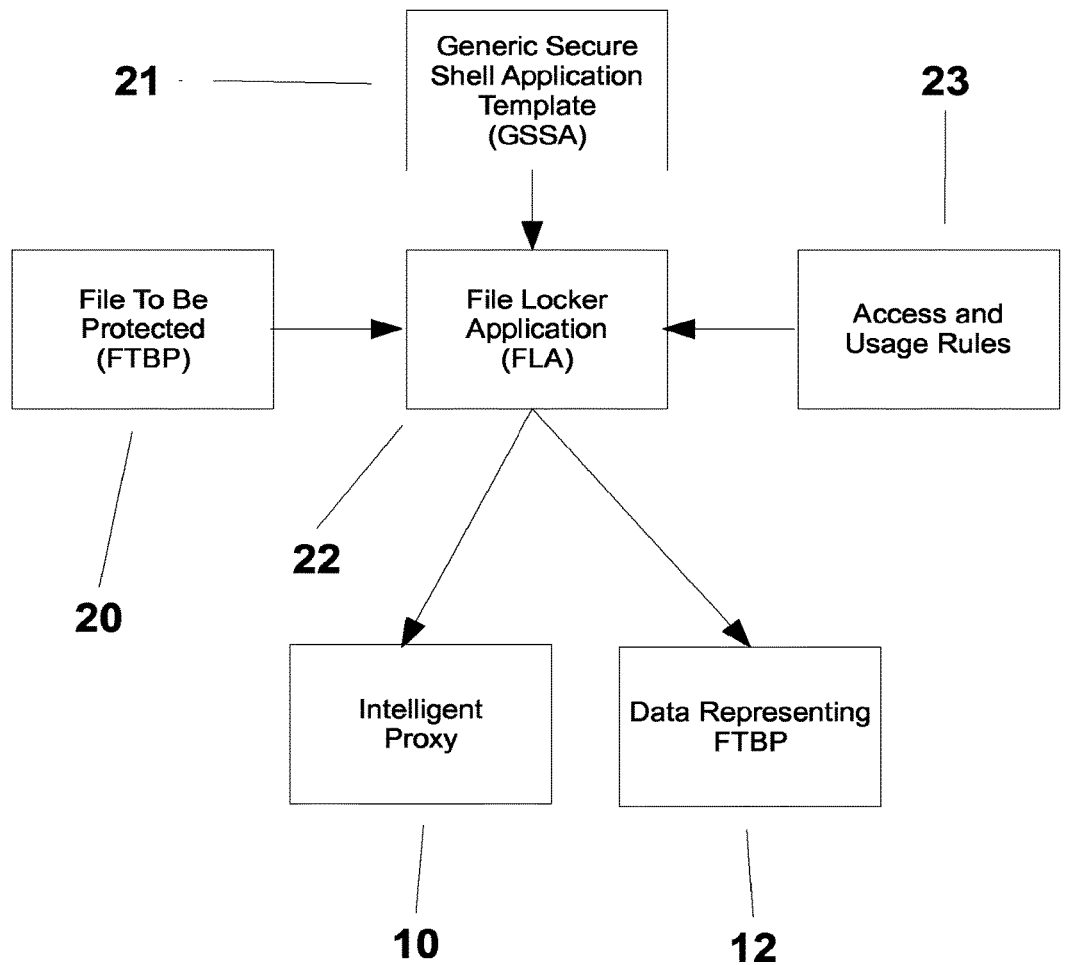
FIG. 2—This figure depicts the construction of an intelligent proxy from the FTBP and Generic Secure Shell Application (GSSA) using the proxy making tool called the File Locker Application (FLA).

It is possible to generate the proxy by writing all the code and compiling, a procedure well known in the art, and this is an entirely permissible embodiment of this invention. However, because this process takes considerable skill, it is advantageous to have a simpler mechanism for proxy construction. In one embodiment, the proxy is created by a program called the File Locker Application (FLA) that uses the FTBP to create the proxy. FIG. 2 depicts this process. The FTBP 20 and a generic proxy called the Generic Secure Shell Application (GSSA) 21 are input into the FLA 22 along with authentication rules and usage policy 23 whose format are governed by the particular FLA being used, and the proxy 10 and data representing the FTBP 12 are the output of this process. The proxy is then distributed to users in lieu of the FTBP. The FLA could be anything from a command line application to a sophisticated GUI with "drag and drop" functionality. The FLA may be tailored to protect one or several different FTBP data types. Finally, the FLA may either automatically or manually select the appropriate viewer mechanism to embed into the proxy.

Figure 3:
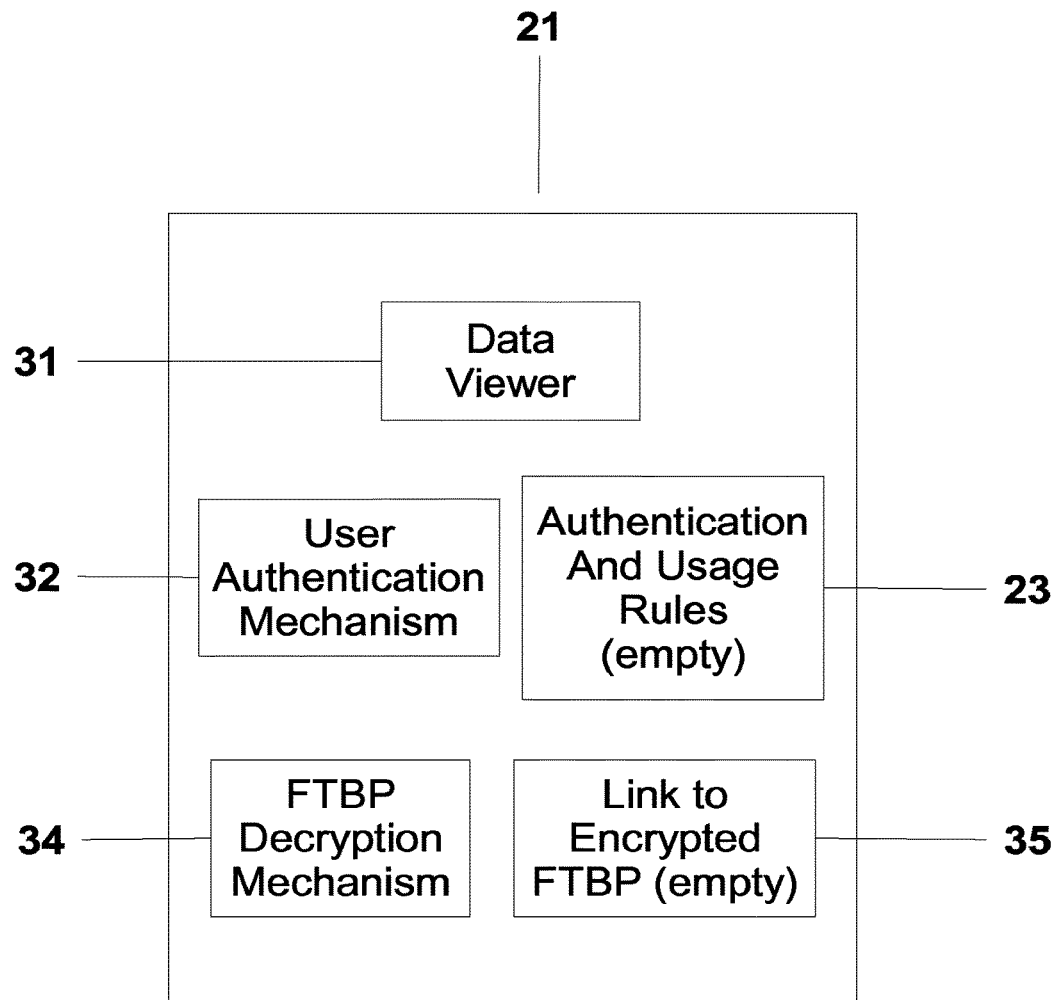
FIG. 3—This figure depicts the organization of the parts of the GSSA.

The GSSA is specific to a particular flavor of the FLA. A typical GSSA is depicted in FIG. 3. The GSSA 21 is a combination of a generic file viewer 31 with configurable authentication 32 built in. The authentication and usage policy rules 23 used by the authentication comprise an empty set. The format of the authentication and usage rules 23 are specific to the particular FLA and GSSA and are chosen to meet the security needs of the FTBP. For example, the authentication and usage rules could be, but are not limited to, number of times the FTBP may be accessed, the identity of the host machine (hard drive id label or serial number for instance), password protection, secure network connection giving permission on a per-access basis, etc. The security policy is intentionally flexible as it is not the object of the present invention, but rather the proxy itself is the object of this invention. Finally, the GSSA contains an optional encryption/decryption engine 34 used to access the data representing the FTBP through the link 35. The link 35 and security rules 23 are empty in the GSSA and are filled out by the FLA, and the encryption/decryption engine 34 is present only if the data 35 is encrypted.

A particular GSSA contains a generic viewer 31 for a particular FTBP data type. For example, if the FTBP is a video clip, the appropriate GSSA contains a video player. If the FTBP is an executable program, the GSSA contains a mechanism to launch that executable program, e.g. in Linux, fork ( ) and exec ( ). In this manner, it becomes possible for the data to be accessed, but that access is controlled by a usage policy specifically disallowing generation of an unencrypted copy of the FTBP as well as any other additional usage policy constraints. The proxy may or may not, according to design decision, allow the data to be modified and saved, but only by the proxy. That is, if the data may be modified and saved, it does not generate an unprotected copy of the FTBP that the user may save anywhere and have unfettered access, but rather it maintains only a single copy of the data representing the FTBP that is accessible only through the proxy, and only according the security access rules and usage policy.

Data Representing the File to be Protected

Figure 4:
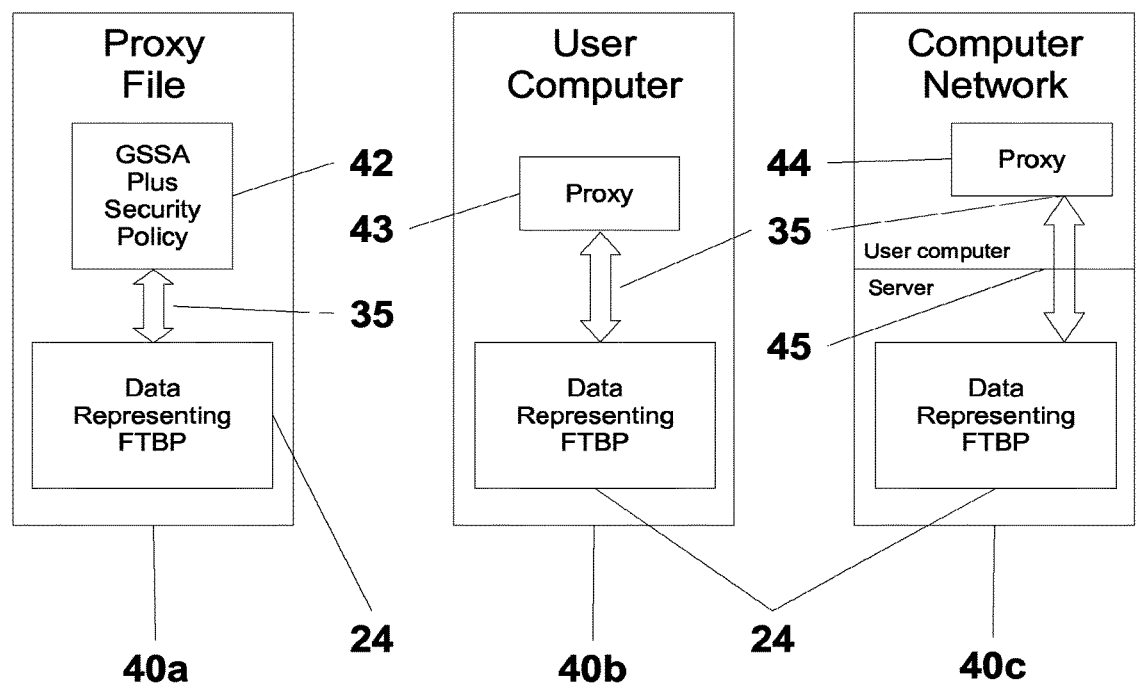
FIG. 4—This figure depicts several configurations of how and where encrypted data representing the original FTBP is accessed.

The location of the data representing the proxy viewable FTBP defines several embodiments of the invention. FIG. 4 depicts three possible embodiments representing both local and remote storage cases. These are only possibilities, and the specific enumeration of these embodiments is not intended to limit the scope of this invention. In the case that the data 12 is located on the same machine as the proxy itself, that data may either be part of the proxy itself as in scheme 40a or another file entirely as in scheme 40b. In scheme 40a, the data representing the FTBP 12 may or may not be encrypted. In all other configurations, the data 12 must be encrypted so that only the proxy may decrypt it. The data 12 need not n necessarily be an encrypted copy of the FTBP, although it may be in certain applications. For example, if the FTBP was originally a MS Word document, there is no reason that the format could not be ported to some other format, e.g. PDF, before encryption. The data 12 need only be an encrypted copy of some "mostly equivalent" representation of the data in the FTBP. The point is that the data 12 may reside anywhere as long as it meets the security needs of the FTBP.

In scheme 40a, the proxy contains the data 12, the link 35 that is filled out by the FLA in the "filled out" GSSA 42 is an offset or pointer into the proxy file and the size of the binary image of the data. In the case 40b where the data 12 resides in a different file or files on the same computer, the link 35 in the proxy 43 would contain a path to that file or files and possibly other data necessary for accessing the data 12 within those file(s). In the case 40c where the data 12 resides on a networked machine, the link 35 from the proxy 44 comprises a network connection 45 as is well known in the art, to the server on which the data 12 resides. The network connection link 35 in scenario 40c can be implemented a variety of ways (e.g. SSL, VPN, public key, etc.) as long as the connection is secure such that the FTBP cannot be leaked.

Figure 5:
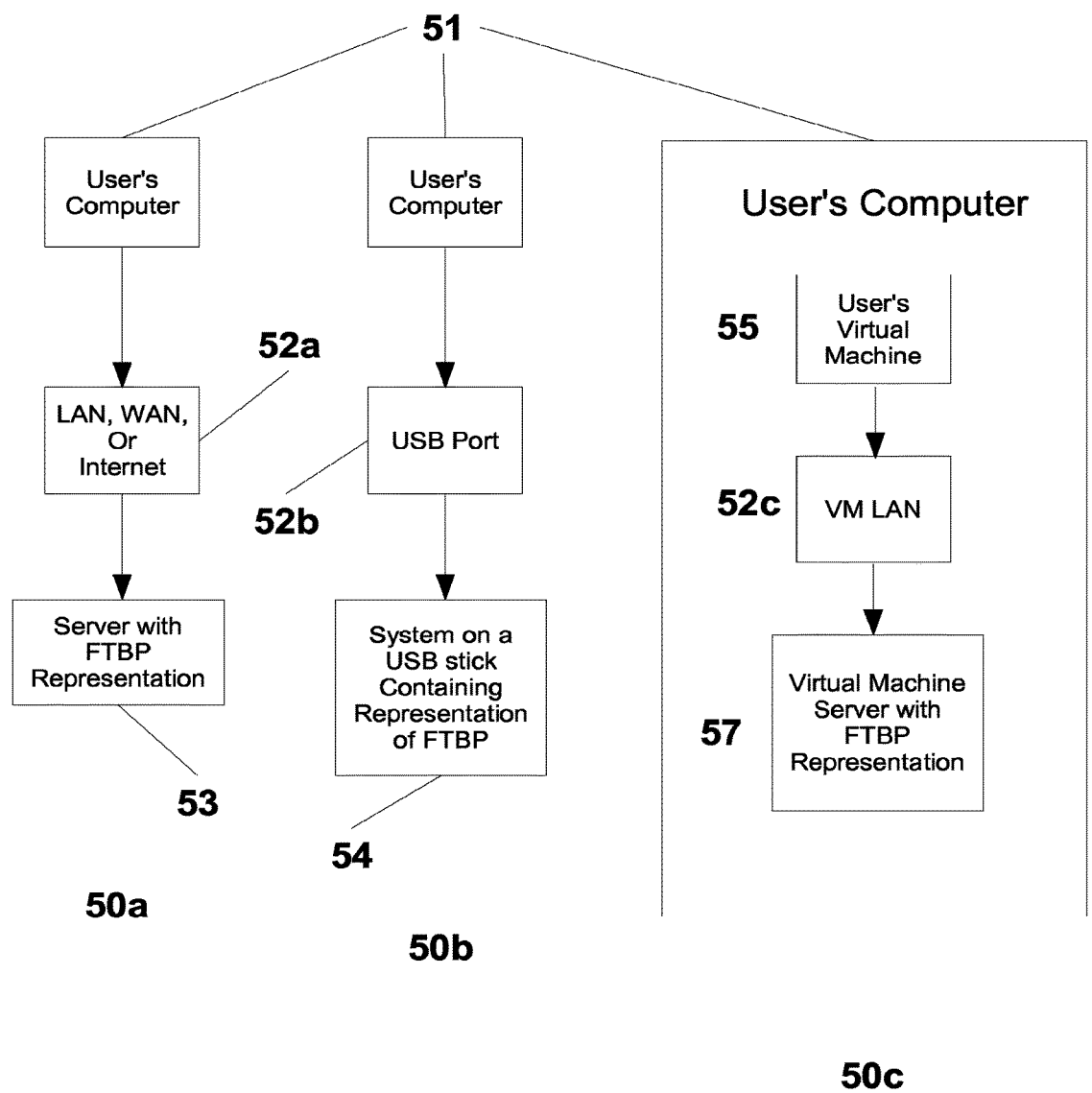
FIG. 5—This figure depicts several scenarios where the data representing the FTBP is acquired from a network.

The line between local and remote storage of the data representing the FTBP can become blurred in some situations that need addressed. FIG. 5 depicts three scenarios where data is received from a networked machine. The first scenario 50a depicts the user's computer 51 and the host 53 being two separate workstations connected by a LAN, WAN, or the Internet 52a. This is the clearest example of data residing on a remote machine. The second scenario 50b depicts the user computer 51 connected through a USB port 52b to a "system on a stick" server 54. The user and host are still distinguishable machines and networked, but it is slightly less clear that the data is "remote". The third scenario 50c depicts a situation where the user's machine is really a virtual machine ("VM") 55 running on the user's computer 51 and the host server 57 is another VM running on the same physical machine using the internal VM LAN 52c. In this scenario, though the FTBP representation is located on "another machine", it is, in fact, residing on the same physical machine, and likely even the same hard drive, albeit in a different logical partition.

Intelligence in the Proxy

The proxy can be as intelligent or as "dumb" as security requires. One embodiment is a "fire-and-forget" proxy whereby no control is retained over the proxy itself after distribution. However, security benefits tremendously from a moving target. In the context of the proxy, intelligence refers to the ability to change authentication and usage rules after distribution of the proxy. In one embodiment, a fire-and-forget proxy wherein the data resides remotely is used in conjunction with additional usage policy and authentication control residing on the same remote server where the data representing the FTBP resides.

Figure 6:
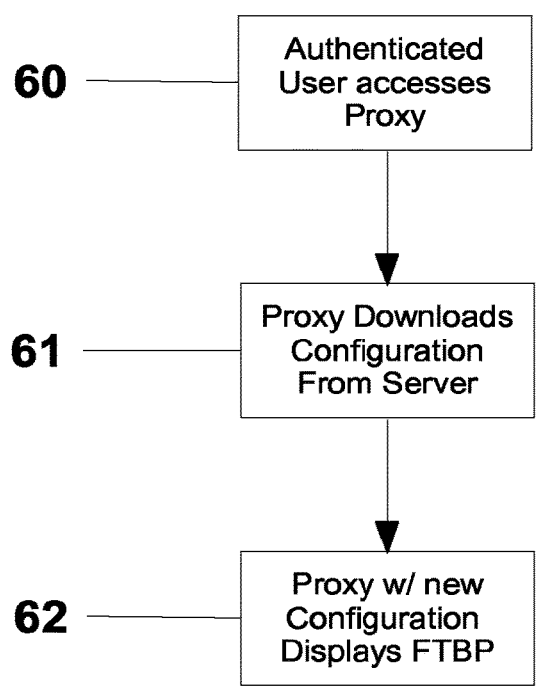
FIG. 6—This figure depicts a generic embodiment of an intelligent proxy being updated each time it is accessed.

In another embodiment, the intelligent proxy is remotely configurable as in FIG. 6. When the user 60 accesses the proxy, it connects to a server to download configuration data 61 which generates a "refreshed" proxy 62 with updated behavior. Examples of configuration data are (1) data in XML or some other format that is interpreted by the proxy to govern authentication or usage policy, (2) another proxy (the user accessible proxy downloads the "real" proxy each time from a server—called proxy within a proxy), (3) pieces of the executable proxy necessary for its use, or (4) a script, e.g. Python, that stitches together pieces of executable code that implements the whole proxy as the proxy need not be limited to being a single executable file. The enumeration of the above examples of configuration data is not to be construed as limiting the invention, but merely examples of how the proxy may be remotely configurable. In any case, adding intelligence to the proxy specifically means retaining any measure of control over authentication, usage policy, and the viewing mechanism even after distribution to users.

Authentication and Usage Policy

The authentication and usage policy govern who is permitted to access the data and how it can be used. The authentication mechanism determines whether a given proxy is potentially permitted to access the FTBP. That is, its function is to limit which copies of the proxy can access the data. The usage policy determines how the data may be accessed, but may also further limit which proxy may access the data. That is, it can decide whether an already authenticated proxy is allowed to use the data.

The authentication mechanism can be chosen from any of the widely available authentication schemes already well known in the art. It could be, but is not limited to computer detection such as hardware or software fingerprint, server handshaking, user name/password combination, IP address, or biometric authentication. Any authentication scheme may be chosen as long as it meets the security needs of the FTBP. It can be any authentication mechanism at all including the null mechanism whereby any proxy is automatically authenticated.

The final dimension that defines embodiments of this invention is the usage policy. All embodiments of this invention contain a usage policy that specifically disallows regeneration of the original FTBP for copying. It is a major feature of this invention that the FTBP is never directly accessible by any user. Furthermore, the usage policy is determined, at least in part, by the choice of viewer mechanism chosen to display the human readable rendering of the FTBP.

Other embodiments can further define usage policy, specifically limiting access of users that pass the authentication step. In one embodiment, there is a time limit on how long the FTBP is available before expiring. In another embodiment, the usage policy disallows access after one or more failed authentication attempts by, for instance, destroying the data representing the FTBP. In another embodiment, there is a maximum number of times the proxy may be used to access the FTBP. In another embodiment, the usage policy is partly controlled by a remote server in addition to any usage policy contained specifically within the proxy as mentioned previously. In another embodiment, the usage policy allows simultaneous access by a limited number of proxies.

Figure 7:
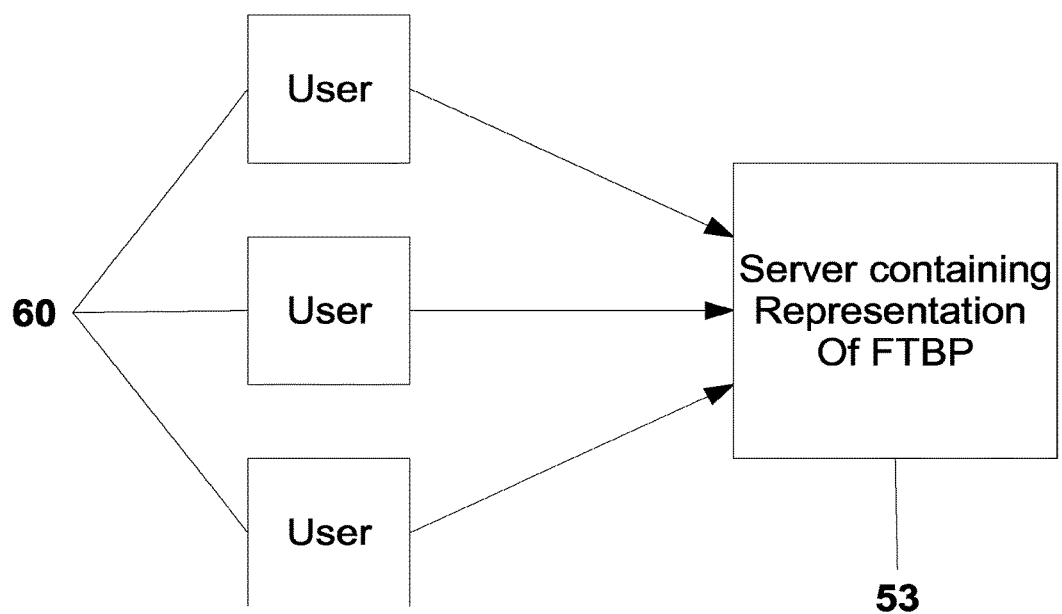
FIG. 7—This figure depicts an authorized user creating child proxies to allow multiple users one-at-a-time exclusive access to the FTBP content that the first user owns.

In another embodiment, the user retains "ownership" of a copy of the FTBP. In this embodiment, the user does not have an actual copy of the FTBP, but has a proxy that allows use of the FTBP including transfer of usage rights to another proxy. This is the digital equivalent of having a physical CD or DVD that the user can distribute to any other single user at a time. There are a multitude of ways this can be accomplished. One such way is depicted in FIG. 7. Authenticated users 60 connect to a server 53 which can reside anywhere including one of the user's machines. The server decides at any moment which user's proxy can have access to the FTBP. The usage policy is a matter of architectural decision and could be, but is not limited to, first come/first serve, privileged user who decides FTBP usage, or time share. Alternatively, possession of the copy of the FTBP could be managed via USB "machine on a stick". In this embodiment, the FTBP is private to the USB computer and not directly accessible by the user machine, but could be transferred to another USB computer connected either to the same user machine or to a remote machine via the Internet using an encrypted pipe. However it is architected, the user owns a single copy that is freely distributable, but is not able to promulgate new copies.

We claim:

1. A system for securing a computer file comprising:
a processor;
a memory communicatively coupled to the processor;
a data representation of a protected computer file;
an executable intelligent proxy application configured having a one-to-one relationship to protect a single computer file and configured as an interface for regulating access to the single protected computer file stored in the memory and controlling data associated with the protected computer file, wherein:
the intelligent proxy application receives a user request from a user device to directly access the protected computer file from the memory;
the intelligent proxy application is embedded with access credentials unknown to at least one user and the user device and the intelligent proxy application uses the access credentials to initiate retrieval of the data representation of the protected computer file;
the intelligent proxy application comprising the access credential retrieves and presents the data representation of the protected computer file in response to the user request rather than permitting direct access to the protected computer file;
the intelligent proxy application contains a usage policy that defines usage terms of the data representation of the protected computer file and disallows copying of the protected computer file; and the intelligent proxy application uses a networked machine system, such that a networked machine comprises a secure operating system with an encrypted file system and the networked machine uses networking and file sharing to provide secure access to the protected computer file; and a display device for converting the data representation of the protected computer file to a human readable rendering.

2. The system for securing a computer file of claim 1 further comprising:

a repository for storing the data representation, wherein the repository is a storage location associated with the intelligent proxy application, a computer comprising the intelligent proxy application, a remote computer with a first network connection to the computer comprising the intelligent proxy application, or the networked machine with a second network connection to the computer comprising the intelligent proxy application.

3. The system for securing a computer file of claim 1 wherein the intelligent proxy application is an identical representation of the protected computer file.

4. The system for securing a computer file of claim 1 further comprising a file generating mechanism for generating the intelligent proxy application wherein the file generating mechanism constructs the intelligent proxy application using the protected computer file and a generic secure shell application.

5. The system for securing a computer file of claim 1, wherein the usage policy restricts access to the data representation.

6. The system for securing a computer file of claim 1, wherein the usage policy instructs the destruction of a repository storing the data representation.

7. The system for securing a computer file of claim 1 further comprising an ownership right incorporated into the usage policy, wherein the ownership right of the intelligent proxy application is transferred to a copy of the intelligent proxy application when the intelligent proxy application is copied.

8. The system for securing a computer file of claim 1, wherein the intelligent proxy application is associated with an operating system that operates at a level, which is inaccessible to the user request.

9. The system for securing a computer file of claim 1, wherein the protected computer file is stored in a local storage relative to the user device and the intelligent proxy application.

10. The system for securing a computer file of claim 1, further comprising a multiple user operating system for allocating and managing access to different services based on different user credentials.

11. The system for securing a computer file of claim 1, wherein changing a user network credential deactivates a user's decryption key associated with the protected computer file and scrambles the protected computer file.

12. The system for securing a computer file of claim 1, further comprising a server configured to perform peer-to-peer file sharing.

13. The system for securing a computer file of claim 1, further comprising advanced network file sharing, wherein:

a network file sharing mechanism does not make temporary copies of shared files on a local computer; and shared file images are stored in a memory or a swap space on the user device and advanced computer forensics using non-trivial efforts to extract raw data from the shared file images.

14. The system for securing a computer file of claim 1, further comprising a peer-to-peer secure storage device configured as a server using VPN based encryption for transmission of the protected computer file.

15. The system for securing a computer file of claim 1, further comprising a VPN connection established to a secure, encrypted transmission of the protected computer file, and wherein the VPN connection is established by a VPN generating mechanism.

16. The system for securing a computer file of claim 15, wherein the VPN connection is automatically established by the intelligent proxy application.

17. A method for securing a computer file comprising:

providing a processor;

providing a memory communicatively coupled to the processor;

providing a data representation of a protected computer file;

providing an executable intelligent proxy application configured having a one-to-one relationship to protect a single computer file and configured as an interface for regulating access to the protected computer file stored in the memory and controlling data associated with the protected computer file;

receiving, at the intelligent proxy application, a user request from a user device to directly access the protected computer file from the memory;

embedding, within the intelligent proxy application, access credentials unknown to at least one user and the user device and using the access credentials to initiate retrieval of the data representation of the protected computer file;

retrieving and presenting, by the intelligent proxy application comprising the access credential, the data representation of the protected computer file in response to the user request rather than permitting direct access to the protected computer file; and embedding a usage policy within the intelligent proxy application, wherein the usage policy defines usage terms of the data representation of the protected computer file and disallows copying of the protected computer file;

using, by the intelligent proxy application, a networked machine system, such that a networked machine comprises a secure operating system with an encrypted file system and the networked machine uses networking and file sharing to provide secure access to protected computer file; and converting the data representation of the protected computer file to a human readable rendering for display on a display device.

18. The method for securing a computer file of claim 17, wherein the intelligent proxy application is associated with an operating system that operates at a level, which is inaccessible to the user request.

19. The method for securing a computer file of claim 17, further comprising:

allocating and managing access to different services based on different user credentials, and when a change to a user network credential occurs, deactivating a user's decryption key associated with the protected computer file and scrambling the protected computer file.

20. The method for securing a computer file of claim 17, further comprising:
  storing the protected computer file in a local storage relative to the user device and the intelligent proxy application.

21. The method for securing a computer file of claim 17, further comprising:
  providing a peer-to-peer secure storage device configured as a server using a VPN based encryption for transmission of the protected computer file.

22. The method for securing a computer file of claim 17, further comprising:
  providing a client server configured to employ VPN based encryption for transmission of the protected computer file.

23. The method for securing a computer file of claim 17, further comprising:
  establishing a VPN connection to provide a secure, encrypted transmission of the protected computer file.

24. A system for securing a computer file comprising:
  a processor;
  a memory communicatively coupled to the processor;
  a data representation of a protected computer file;
  an executable intelligent proxy application configured having a one-to-one relationship to protect a single computer file and configured as an interface for regulating access to the single protected computer file stored in the memory and controlling data associated with the protected computer file, wherein:
    the intelligent proxy application receives a user request from a user device to directly access the protected computer file from the memory;
    the intelligent proxy application is embedded with access credentials unknown to at least one user and the user device and the intelligent proxy application uses the access credentials to initiate retrieval of the data representation of the protected computer file;
    the intelligent proxy application comprising the access credential retrieves and presents the data representation of the protected computer file in response to the user request rather than permitting direct access to the protected computer file;
    the intelligent proxy application contains a usage policy that defines usage terms of the data representation of the protected computer file and disallows copying of the protected computer file; and
    the intelligent proxy application uses a virtual machine system and a networked machine system, such that:
      a virtual machine comprises a first secure operating system with a first encrypted file system and the virtual machine uses virtual networking and file sharing to provide secure access to the protected computer file; and
      a networked machine comprises a second secure operating system with a second encrypted file system and the networked machine uses networking and file sharing to provide secure access to the protected computer file; and
  a display device for converting the data representation of the protected computer file to a human readable rendering.

* * * * *